United States Patent Office 3,708,487
Patented Jan. 2, 1973

---

3,708,487
CERTAIN 2[1H]PYRIDON-4-YL PHOSPHATES AND PHOSPHOROTHIONATES
Norman C. Brown and Gerald S. Poll, Berkhamsted, England, assignors to Cooper, McDougall & Robertson Limited, Berkhamsted, England
No Drawing. Filed Oct. 18, 1967, Ser. No. 676,046
Claims priority, application Great Britain, Oct. 25, 1966, 47,933/66
Int. Cl. C07d *31/50*
U.S. Cl. 260—294.8 K          10 Claims

ABSTRACT OF THE DISCLOSURE

This invention relates to novel compounds which are toxic to a variety of arthropod pests.

In particular this invention relates to compounds of the following formula which exhibit the above mentioned activity

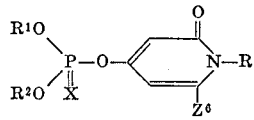

wherein $R^1$ and $R^2$ are selected from the class consisting of alkyl hydrocarbon radicals having 1 to 4 carbon atoms;

R is selected from the class consisting of hydrogen, and saturated and unsaturated acyclic aliphatic hydrocarbon radicals having 1 to 6 carbon atoms;

$Z^6$ is an alkyl hydrocarbon radical having from 1 to 4 carbon atoms; and

X is selected from the class consisting of oxygen and sulphur.

---

The invention also relates in particular to formulations comprising these compounds, and their use in controlling the pests.

This invention relates to organo-phosphorus compounds, their chemical preparation, pesticidal formulations containing them, and to their use in the control of pests.

It has been found that the pyridine-phosphorus esters of Formula I have pesticidal properties in tests carried out against a variety of arthropod pests. For example they have been found to be toxic to *Tetranychus telarius* (two-spotted spider mite), *Conotrachelus nenuphar* Herbst (plum curculio), *Epilachna varivestis* Mulsant (Mexican bean beetle), *Macrosiphum pisi* (pea aphid), *Oncopeltus fasciatus* (Dallas) (milkweed bug), *Prodenia eridania* (southern armyworm), *Musca domestica* (common housefly), and *Boophilus* spp. (cattle ticks).

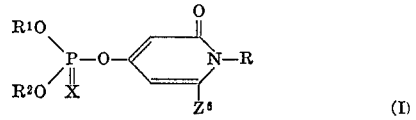

In Formula I, $R^1$ and $R^2$ are the same or different and each is an alkyl radical having 1 to 4 carbon atoms;

R is hydrogen or a saturated or unsaturated acyclic aliphatic hydrocarbon radical having 1 to 6 carbon atoms;

$Z^6$ is an alkyl group having from 1 to 4 carbon atoms; and

X is oxygen or sulphur.

$R^1$, $R^2$, and R may be branched or unbranched chains; and R may, for example, be an alkyl or an alkenyl radical. $Z^6$ is preferably a methyl group; $R^1$ and $R^2$ are preferably the same and each is a methyl or ethyl group; and R has preferably 1 to 3 carbon atoms and may be, for example, a methyl or ethyl group.

The compounds of Formula I may be prepared by any method for making known compounds of analagous structure. Thus they may be prepared by reaction of a phosphorus compound of Formula II with a compound of Formula III

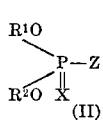   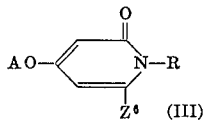

wherein $R^1$, $R^2$, R, X and $Z^6$ are defined above, Z is halogen preferably chlorine, and A is hydrogen. The reaction is carried out in the presence of a hydrogen halide binding agent for example an alkali metal carbonate such as potassium carbonate. A liquid medium for the reactants should also be present and is preferably a polar solvent such as ethanol, dimethylformamide, acetonitrile, dimethyl sulphoxide, an acetone/water mixture, isobutyl methyl ketone or ethyl methyl ketone. The reaction is preferably conducted with heating at the reflux temperature of the reaction mixture. The reaction may be performed in the absence of a halogen halide binding agent if in the compound of Formula III, A is an alkali metal atom, for example potassium.

The compounds of Formula I are not usually applied full strength for the control of arthropod pests. These active ingredients in concentrations from about 0.5% to 95% by weight are generally incorporated with carriers in a pesticidal formulation in order to facilitate dispersion of chemicals for these applications, recognising that the formulation and mode of application may affect the activity of the compounds. The compounds of Formula I may be applied for the control of arthropod pests as a spray, dust or granule. They may be formulated as granules of large particles size, as powdery dusts, as wettable powders, as emulsifiable concentrates, or as solutions. More preferably, they are applied as emulsifiable concentrates, or as wettable powders.

Wettable powders are in the form of finely divided particles which disperse readily in water or other dispersant, normally due to the presence of a dispersing agent. The powder may be applied as a dry dust or preferably as an emulsion in water. For application in control of anthropod pests which infect domestic animals, emulsifiable concentrates and wettable powders are diluted with water to produce a dip wash into which the animals may be immersed.

Typical inert carriers include fuller's earth, kaolin, silica and other highly absorbent solid inorganic or organic diluents. Typical wetting, dispersing or emulsifying agents which may be used in formulations of the present invention include, for example, the alkyl and alkylaryl sulphonates and sulphates and their sodium salts, alkylamide sulphonates including fatty methyl taurides, alkylaryl polyether, alcohols, sulphated higher alcohols, and polyvinyl alcohols; polyethylene oxides; sulphonated animal and vegetable oils; sulphonated petroleum oils; fatty acid esters of polyhydric alcohols and the ethylene oxide addition products of such esters; and the addition products of long chain mercaptans and ethylene oxide. Many other types of useful surface active agents are available in commerce.

This invention therefore provides compounds of Formula I; their preparation as hereinbefore described; pesticidal formulations of a compound of Formula I, and their preparation by admixture of the active ingredient with an inert carrier. The invention also comprises a method of controlling arthropod pests by subjecting the pests to an effective dose of a compound of Formula I.

The following are examples of this invention.

EXAMPLE 1

The preparation of O,O-dimethyl-O-(1,6-dimethyl-pyrid-2-on-4-yl phosphorothionate 1,6-dimethyl-4-hydroxypyrid-2-one (13.9 g.), anhydrous potassium (27.6 g.) and acetone (250 ml.) were stirred at 40–50° C. for one hour. O,O-dimethyl phosphorochloridothionate (16 g.) was added dropwise over 30 minutes and the mixture stirred for a further 2–3 hours at 40° C. The mixture was then allowed to stand overnight.

Inorganic salts were then removed by filtration and the solvent removed in vacuo. The residual oil was dissolved in benzene (150 ml.) and washed with a 2 N solution of sodium hydroxide (3× 100 ml.), water (100 ml.) and a saturated solution of sodium chloride and dried over anhydrous sodium sulphate. Removal of the solvent in vacuo yielded an oil, O,O-dimethyl-O-(1,6-dimethyl-pyrid - 2 - on - 4-yl)phosphorothionate, refractive index, $n_D^{20}=1.5370$.

EXAMPLE 2

The preparation of O,O-dimethyl-O-(1-allyl-6-methyl pyrid-2-on-4-yl phosphate 1-allyl-6-methylpyrid-2-one (12.0 g.), anhydrous potassium carbonate (27.6 g.), acetone (250 ml.) were stirred for one hour at 50° C. O,O-dimethyl phosphorochloridate (10.5 g.) was added dropwise over 30 minutes and the mixture stirred for a further 2–3 hours at 50° C. The mixture was then allowed to stand overnight.

Inorganic salts were then removed by filtration and the solvent removed in vacuo. The residual oil was dissolved in benzene (150 ml.) and washed with a 2 N solution of sodium hydroxide (3× 100 ml.), water (100 ml.) and a saturated solution of sodium chloride and dried over anhydrous sodium sulphate. Removal of the solvent in vacuo yieled O,O-dimethyl-O-(1-allyl-6-methylpyrid-2-on 4-yl)phosphate, having a refractive index $n_D^{20}=1.5160$.

EXAMPLE 3

The preparation of O,O-diethyl-O-(1,6-dimethyl-pyrid-2-on-4-yl phosphorothionate 1,6 - dimethyl - 4 - hydroxypyrid - 2 - one (15.5 g.), anhydrous potassium carbonate (27.6 g.) and ethyl methyl ketone (250 ml. were stirred and heated at reflux for one hour. O,O-diethyl-phosphorochloridothionate (18.9 g.) was then added to the reaction mixture during 30 minutes at a temperature of 40° C. The reaction mixture was then held at this temperature for a further 3 hours. The reaction mixture was filtered to remove suspended solids and the solvent removed by evaporation under reduced pressure. The residual oil was dissolved in benzene-hexane mixture (1:1,100 ml.) and then passed through a column of acid washed alumina. The solvent was then removed by evaporation under reduced pressure to yield a pale yellow oil, which on dissolving in hot di-isopropyl ether (50 ml.) and cooling, gave colourless crystals of melting point 62–3° C., identified as O,O-diethyl-O-(1,6-dimethylpyrid-2-on-4-yl) phosphorothionate.

EXAMPLE 4

The preparation of O,O-diethyl-O-(1,6-dimethyl-pyrid-2-on-4-yl phosphate

Stage I: Sulphuric acid, specific gravity 1.84 (379 ml.) was added to water (53 ml.) The sulphuric acid solution so obtained was heated and stirred in an oil bath at 74° C. Dehydracetic acid (250 g.) was dissolved in the sulphuric acid solution and the reaction mixture heated to 120° C. during 40 minutes. The solution was then tested for completeness of reaction by adding a few drops of the reaction mixture to water. If the reaction was complete, no immediate precipitate was observed. The solution was then cooled to 20–25° C. and poured onto flaked ice and water (1 kg.) and stirred for 1 hour. The mixture was then filtered, washed with a little cold water and dried to give the crude product (129 g.), 68.7% yield. This material was suitable for the next stage.

30 g. of the above, on recrystallisation from water (270 ml.) gave pure 4-hydroxy-6-methylpyran-2-one (18.6 g.) of melting point 186–8° C.

Stage II: 4-hydroxy-6-methylpyran-2-one (66 g.) was dissolved in 25–30% aqueous methylamine (135 ml.) and stirred for 2 hours at 80° C. The solution was cooled, acidified slowly to pH 5 by the addition of concentrated hydrochloric acid to the stirred solution. The product so obtained was filtered and dried to yield 53 g. of crude product, which on crystallisation from water (600 ml.) yielded 38 g. of pure 1,6-dimethyl-4-hydroxypyrid-2-one, having a melting point of 226–9° C.

Stage III: 1,6-dimethyl-4-hydroxypyrid-2-one (31 g.), anhydrous potassium carbonate and ethyl methyl ketone (500 ml.) were stirred and heated to reflux for one hour. O,O-diethyl phosphorochloridate (34.5 g.) was then added to the reaction mixture during 30 minutes at a temperature of 40° C. The reaction mixture was then held at this temperature and stirred for a further 3 hours. Following this, the mixture was filtered to remove suspended solids and the solvent removed by evaporation under reduced pressure. The residual oil was dissolved in hexane and benzene, the minimum quantity of benzene being employed to effect solution. The solution was then passed through a column of 60 g. of acid washed alumina and then the solvent was removed under reduced pressure. The resulting pale yellow oil had a refractive index $n_D^{20}=1.5097$ and a phosphorus content of 10.0%. (Theoretical phosphorus content=11.27%).

EXAMPLE 5

O,O - diethyl - O - (1 - n - propyl-6-methylpyrid-2-on-4-yl) phosphorothionate was prepared in the manner described in Example 1 from O,O-diethyl phosphorochloridothionate and 1-n-propyl-6-methyl-4-hydroxypyrid-2-one, and had a melting point 30–32° C. The 4-hydroxy intermediate was prepared in the manner described by Arndt et al., Ber. 69B, 1936, 2373–80, and had a melting point 194–196° C.

EXAMPLE 6

The preparation of O,O-diethyl-O-(1-allyl-6-methyl-pyrid-2-on-4-yl) phosphorothionate 4-hydroxy-6-methylpyran-2-one (275 g.) was stirred in water (1400 ml.) and allylamine added (180 ml.). The reaction mixture was heated to 75° C. during one hour and held at this temperature for a further 4 hours. Some separation of the product occurred after 2–3 hours' heating. The reaction mixture was allowed to cool and stand overnight, filtered, and the product washed with cold water and dried. Recrystallisation from 2 parts of ethanol plus 1 part of benzene gave 1-allyl-4-hydroxy-6-methyl-pyrid-2-one (222 g.), 61.5% yield having a melting point of 160–3° C.

1-allyl-4-hydroxy-6-methylpyrid-2-one (1020 g.), anhydrous potassium carbonate (2 kg.) and ethyl methyl ketone (6000 ml.) were stirred at 40° C. for one hour. O,O-diethyl phosphorochloridothionate (1165 g.) was added dropwise during one hour. The reaction mixture was stirred for a further three hours and allowed to stand overnight. The supernatant solution was decanted and filtered and the residue washed with a further small quantity of ethyl methyl ketone which was added to the bulk. Evaporation of the solvent under reduced pressure yielded an oil which was dissolved in benzene (5000 ml.). The benzene solution was washed with 2 N sodium hydroxide solution (3× 750 ml.), water (500 ml.), saturated brine (500 ml.) and dried over anhydrous sodium sulphate. Evaporation of the solvent yielded a purple oil, refractive index $n_D^{20}$=1.5370. Removal of the purple colour was achieved in small quantities by elution of the benzene solution on acid washed alumina.

EXAMPLE 7

O,O - dimethyl-O-(1,6-dimethylpyrid-2-one-4-yl) phosphate was prepared from O,O-dimethyl phosphorochloridate and 1,6-dimethyl-4-hydroxypyrid-2-one in the manner described in Example 2 to yield a viscous orange oil, refractive index $n_D^{20}$ 1.5392 (phosphorus content: theory 12.56%; found upon analysis 12.5%).

EXAMPLE 8

O,O-di-n-propyl-O-(1,6-dimethylpyrid-2-on-4-yl) phosphorothionate was prepared from O,O-di-n-propyl phosphorochloridothionate and 1,6-dimethyl-4-hydroxypyrid-2-one in the manner of Example 1 (phosphorus content: theory 9.72%; found upon analysis 9.85%) and had a melting point of 51–53° C.

EXAMPLE 9

O,O-di-isopropyl-O-(1,6-dimethylpyrid-2-on-4-yl) phosphorothionate was prepared from O,O-di-isopropyl phosphorochloridothionate and 1,6-dimethyl-4-hydroxy pyrid-2-one in the manner of Example 1 (phosphorus content: theory 9.72%; found upon analysis 9.8%), and had a melting point 82–83° C.

EXAMPLE 10

The preparation of O,O-diethyl-O-(1-n-propyl-6-methylpyrid-2-on-4-yl) phosphate 4-hydroxy-6-methylpyran-2-one (46 g.), n-propylamine (24 g.) and water, 180 ml., were heated to reflux and stirred for 2 hours. The solution was cooled to room temperature when a yellow solid was obtained. The solid was filtered off, dried and recrystallised from industrial methylated spirits to yield 1-n-propyl-4-hydroxy-6-methylpyrid-2-one (36 g.) having a melting point 194–196° C.

1 - n - propyl-4-hydroxy-6-methylpyrid-2-one (17.9 g.), anhydrous potassium carbonate (27.6 g.) and ethyl methyl ketone (250 ml.) were stirred and heated to reflux for one hour. O,O-diethyl phosphorochloridate (17.3 g.) was added during 30 minutes at 40° C.

The preparation was continued in the manner described in Example 3 to yield O,O-diethyl-O-(1-n-propyl-6-methylpyrid-2-on-4-yl) phosphate, having a melting point of 42–4° C.

EXAMPLE 11

O,O-dimethyl-O-(1-allyl-6-methylpyrid-2-on-4-yl) phosphorothionate was prepared from O,O-dimethyl phosphorochloridothionate and 1-allyl-4-hydroxy-6-methylpyrid-2-one in the manner described in Example 1 (phosphorus content: theory 10.73%; found on analysis 10.9%), and had a refractive index $n_D^{20}$ 1.5615.

EXAMPLE 12

O,O-diethyl-O-(1-ethyl-6-methylpyrid-2-on-4-yl) phosphorothionate was prepared from O,O-diethyl phosphorochloridothionate and 1-ethyl-4-hydroxy-6-methylpyrid-2-one, in the manner described in Example 1 and had a refractive index $n_D^{20}$ 1.5200.

EXAMPLE 13

O,O - diethyl - O-(1-isopropyl-6-methylpyrid-2-on-4-yl) phosphorothionate was prepared in the manner described in Example 1 from O,O-diethyl phosphorochloridothionate and 1-isopropyl-4-hydroxy-6-methylpyrid-2-one, and had a refractive index $n_D^{20}$ 1.5211.

The pyridone intermediate was made by the method described by Arndt et al., Ber. 69B, 1936, 2373–80, and had a melting point 159–161° C.

EXAMPLE 14

O,O-diethyl-O-(1-ethyl-6-methylpyrid-2-on-4-yl) phosphate was prepared from O,O-diethyl phosphorochloridate and 1-ethyl-4-hydroxy-6-methylpyrid-2-one, in the manner described in Example 2, and had a refractive index $n_D^{20}$ 1.4974.

EXAMPLE 15

O,O - diethyl-O-(1-allyl-6-methylpyrid-2-on-4-yl) phosphate was prepared from O,O-diethyl phosphorochloridate and 1-allyl-4-hydroxy-6-methylpyrid-2-one, in the manner described in Example 2, and had a refractive index $n_D^{20}$ 1.5130.

EXAMPLE 16

O,O - diethyl - O-(1-isopropyl-6-methylpyrid-2-on-4-yl) phosphate was prepared from 1-isopropyl-4-hydroxy-6-methylpyrid-2-one and O,O-diethyl phosphorochloridate in the manner described in Example 2.

EXAMPLE 17

O,O - diethyl - O - (1-n-butyl-6-methylpyrid-2-on-4-yl) phosphorothionate was prepared from O,O-diethyl phosphorochloridothionate and 1-n-butyl-4-hydroxy-6-methylpyrid-2-one, in the manner described in Example 1 and had a refractive index $n_D^{20}$ 1.5264.

The intermediate pyridone referred to above was prepared in the manner described by Arndt et al., Ber. 69B, 1936, 2373–80, and had a melting point 158–60° C.

EXAMPLE 18

O,O - diethyl - O - (1-isobutyl-6-methylpyrid-2-on-4-yl) phosphorothionate was prepared from O,O-diethyl phosphorochloridothionate and 1-isobutyl-4-hydroxy-6-methylpyrid-2-one, in the manner described in Example 1 and had a refractive index $n_D^{20}$ 1.5273.

The intermediate pyridone described above was prepared in the manner described by Arndt et al., Ber. 69B, 1936, 2373–80, and had a melting point 178–180° C.

EXAMPLE 19

The following are examples of formulations which may be used to incorporate a compound or compounds of Formula I. In each of the above formulations, the active ingredient is O,O-diethyl-O-(1-allyl-6-methylpyrid-2-on-4-yl) phosphorothionate.

This compound may be replaced by, or combined with, other compounds of Formula I.

A wettable powder: Percent
- Active ingredient _____w./w__ 25.00
- Sodium lignosulfonate _____ 1.50
- Sodium alkylnaphthalenesulfonate _____ 1.50
- Attapulgite clay _____ 72.00

An emulsifiable concentrate:
- Active ingredient _____w./w__ 20.00
- Calcium alkylbenzenesulfonate _____ 3.00
- Polyalkalene glycol ethers _____ 2.00
- Xylene _____ 75.00

A dust:
- Active ingredient _____w./w__ 5.00
- Sodium lignosulfonate _____ 1.90
- Sodium alkylbenzenesulfonate _____ 1.90
- Attapulgite clay (325 mesh) _____ 91.20

Granules:
- Active ingredient _____w./w__ 15.15
- Isophorone _____ 15.15
- Attapulgite clay (24/48 mesh) _____ 69.70

The compounds were tested for activity against various arthropod pests in the following manner.

Contact insecticidal activity was measured as follows: To 0.5 gram of test chemical was added two drops of surfactant (Triton X–100) and 40 ml. of acetone. This mixture was stirred until homogeneous, then to it was added 360 ml. of water. This solution contained 1250 p.p.m. of test solution. Further dilution with water gave solutions having the concentrations called for in the studies.

Using a solution of the desired concentration, treatment of plants or containers was made appropriate to the particular insect to be studied as follows:

Mexican bean beetle (*Epilachna varivestis* Mulsant): leaves of pinto bean plants (*Phaseolus vulgaris*) were dipped in the solution, allowed to dry and ten insects placed in wire cages surrounding the plant.

Southern armyworm (*Prodenia eridania*): same as for the Mexican bean beetle.

Pea aphid (*Mascrosiphum pisi*): as for Mexican bean beetle except substituting broad beans (*Vicia faba*) for pinto beans.

Two-spotted mites (*Tetranychus telarius*): leaves of pinto bean plants were infested with two-spotted mites and the mites allowed to begin webbing. The infested leaves were individually dipped and allowed to dry.

Milkweed bugs (*Oncopeltus fasciatus* (Dallas)): glass dishes containing the insects were sprayed for three seconds with an atomizer. A dry sheet of filter paper was placed in the dish to aid the insects in drying and a wad of cellucotton was added to provide moisture for the insects during their retention period.

Plum curculio (*Conotrachelus nenuphar* Herbst): glass dishes containing the insects and half of a small apple were sprayed for three seconds and allowed to dry.

After 72 hours, exposure, the percent kill obtained was determined by physically counting the dead and living insects. Mortality in control colonies, that is, colonies handled in the same manner, but not treated with the test chemical, was in no case greater than 10 percent.

In studies of the systemic insecticidal properties of the compounds of this invention, a dilute solution of test chemical was prepared as in the procedure for contact activity. The roots of pinto beans at the bifoliate stage of growth were excised and the plant stems suspended in the test solution contained in an orchid tube. After 24 hours, the plants were infested with the test insect. Twenty-four hours after infestation, counts were made of living and dead insects.

The results are shown in Table I.

hydrogen, primary and secondary saturated acyclic alkyls having 1 to 6 carbon atoms and unsaturated acyclic alkenyls having 2 to 6 carbon atoms, Z is a saturated alkyl having 1 to 4 carbon atoms, and X is selected from the class consisting of oxygen and sulphur.

2. A compound of the formula

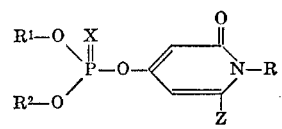

wherein $R^1$ and $R^2$ are alkyl of 1–4 carbon atoms, X is oxygen or sulfur, R is a member selected from the group consisting of alkyl having 1–6 carbon atoms and alkenyl having 2–6 carbon atoms, and Z is alkyl of 1–4 carbon atoms.

3. A compound claimed in claim 1, wherein $R^1$ and $R^2$ are selected from the class consisting of methyl and ethyl, $R^3$ is selected from the class consisting of primary and secondary saturated acyclic alkyls having 1 to 3 carbon atoms and unsaturated acyclic alkenyls having 2 to 3 carbon atoms, Z is methyl, and X is selected from the class consisting of oxygen and sulphur.

4. A compound claimed in claim 1, wherein $R^1$ and $R^2$ are ethyl, $R^3$ is selected from the class consisting of primary and secondary saturated acyclic alkyls having 1 to 3 carbon atoms and unsaturated acyclic alkenyls having 2 to 3 carbon atoms, Z is methyl, and X is selected from the class consisting of oxygen and sulphur.

5. O,O-diethyl-O-(1,6-dimethylpyrid - 2 - on-4-yl)phosphate.

6. O,O-diethyl-O-(1,6-dimethylpyrid - 2 - on-4-yl)phosphorothionate.

7. O,O-diethyl-O-(1-n-propyl - 6 - methylpyrid-2-on-4-yl)phosphate.

8. O,O-diethyl-O-(1-n-propyl - 6 - methylpyrid-2-on-4-yl)phosphorothionate.

9. O,O-diethyl-O-(1-ethyl - 6 - methylpyrid-2-on-4-yl) phosphate.

10. O,O-diethyl-O-(1-allyl - 6 - methylpyrid-2-on-4-yl) phosphate.

TABLE I.—ACTIVITY OF COMPOUNDS OF FORMULA I AGAINST ARTHROPOD PESTS

| Compound of Formula I named in Ex. No.— | Type of activity | Conc., p.p.m. | Percent kill of test pest | | | | | |
|---|---|---|---|---|---|---|---|---|
| | | | Mexican bean beetle | Pea aphid | Milkweed bug | Southern armyworm | Plum curculio | Two-spotted mite |
| 4 | Contact | 1,250 | 100 | 100 | 100 | 100 | 100 | 100 |
| 4 | Systemic | 156 | 100 | 100 | | 95 | | 100 |
| 3 | Contact | 1,250 | 100 | 100 | 100 | 100 | 100 | 100 |
| 3 | Systemic | 156 | 70 | 100 | | 45 | | 100 |
| 10 | Contact | 1,250 | 100 | 100 | 100 | 100 | 100 | 100 |
| 10 | Systemic | 156 | 80 | 100 | | 95 | | 96 |
| 15 | Contact | 1,250 | 95 | 100 | 100 | 100 | 100 | 100 |
| 7 | do | 1,250 | 100 | 100 | 100 | 100 | 100 | 100 |
| 7 | Systemic | 156 | 63 | 100 | | 100 | | 100 |
| 14 | Contact | 1,250 | 100 | 100 | 100 | 100 | 100 | 100 |
| 6 | do | 1,250 | 100 | 100 | 85 | | 100 | 100 |
| 11 | do | 1,250 | 100 | 100 | 100 | 100 | 100 | 100 |
| 11 | Systemic | 1,250 | 67 | 59 | | 50 | | 100 |
| 8 | Contact | 1,250 | 100 | 100 | 100 | 29 | 0 | 100 |
| 9 | do | 1,250 | 100 | 100 | 40 | 0 | 0 | 100 |
| 13 | do | 1,250 | 55 | 100 | 75 | 85 | 100 | 100 |
| 18 | do | 1,250 | 100 | 100 | 100 | 100 | | 100 |

What we claim is:

1. A compound of the formula

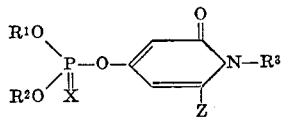

wherein $R^1$ and $R^2$ are saturated alkyls having 1 to 4 carbon atoms, $R^3$ is selected from the class consisting of References Cited

UNITED STATES PATENTS 3,635,987  1/1972  Gubler et al. _____ 260—294.8

ALAN L. ROTMAN, Primary Examiner

U.S. Cl. X.R.

260—297 P, 297 Z; 424—200